(12) United States Patent
Ohnishi

(10) Patent No.: US 7,149,409 B2
(45) Date of Patent: Dec. 12, 2006

(54) REPRODUCTION APPARATUS AND REPRODUCTION METHOD

(75) Inventor: Shinji Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1169 days.

(21) Appl. No.: 09/955,135

(22) Filed: Sep. 19, 2001

(65) Prior Publication Data

US 2002/0071652 A1 Jun. 13, 2002

(30) Foreign Application Priority Data

Sep. 25, 2000 (JP) ............................. 2000-290408

(51) Int. Cl.
*G11B 27/00* (2006.01)
*H04N 5/91* (2006.01)

(52) U.S. Cl. ...................................... 386/52

(58) Field of Classification Search ............. 358/1.15; 386/12, 46, 52, 65, 83; 375/340; 715/716, 715/719, 723

See application file for complete search history.

(56) References Cited

U.S. PATENT DOCUMENTS

| 5,561,532 A | 10/1996 | Ohnishi et al. ............... 386/47 |
| 5,943,444 A | 8/1999 | Shimizu et al. ............. 382/236 |
| 5,978,557 A * | 11/1999 | Kato .......................... 358/1.15 |
| 6,327,391 B1 | 12/2001 | Ohnishi et al. ............. 382/236 |
| 6,795,092 B1 * | 9/2004 | Nagai et al. ................. 715/716 |
| 6,798,839 B1 * | 9/2004 | Iwata et al. ............. 375/240.28 |
| 6,912,057 B1 * | 6/2005 | Idehara ....................... 358/1.1 |
| 2002/0015171 A1 * | 2/2002 | Tsunekawa ................ 358/1.13 |

FOREIGN PATENT DOCUMENTS

WO   WO 9222983   * 12/1992

* cited by examiner

*Primary Examiner*—Thai Tran
*Assistant Examiner*—Mishawn Dunn
(74) *Attorney, Agent, or Firm*—Fitzpatrick, Cella, Harper & Scinto

(57) ABSTRACT

A reproducing apparatus comprises a reproduction unit adapted to reproduce one or more moving image data from a recording medium, and a control unit adapted to control the reproduction unit using program information indicating a reproducing procedure of the one of more moving image data. The control unit (a) determines one or more parts to be deleted from the one or more moving image data using the program information and a non-reproduction period of each moving image data, (b) controls to delete the one or more parts determined by the control unit from the one or more moving image data, and (c) changes the program imformation according to one or more non-deleted parts of the one or more moving image data after the one or more parts determined by the control unit are deleted from the one or more moving image data.

21 Claims, 13 Drawing Sheets

FIG. 3

```
<smil>
  <body>
    <seq>
      <par>
        <audio begin="1min" src="audio1" dur="3min"/>
        <video begin="4min" src="video1" dur="3min"/>
      </par>
      <par>
        <audio src="audio2" dur="2min"/>
        <video begin="3min" src="video4" dur="2min"/>
      </par>
      <par>
        <audio begin="1min" src="audio3" dur="2min"/>
        <video src="video1" dur="2min"/>
      </par>
    </seq>
  </body>
</smil>
```

FIG. 5

| FILE NAME | USED AREA | CORRESPONDING AREA AFTER DATA DELETION |
|---|---|---|
| AUDIO 1 | 1 MIN – 4 MIN | 0 MIN – 3 MIN |
| AUDIO 2 | 0 MIN – 2 MIN | 0 MIN – 2 MIN |
| AUDIO 3 | 1 MIN – 3 MIN | 0 MIN – 2 MIN |
| AUDIO 4 | – | – |
| VIDEO 1 | 0 MIN – 2 MIN | 0 MIN – 2 MIN |
|  | 4 MIN – 7 MIN | 2 MIN – 5 MIN |
| VIDEO 2 | – | – |
| VIDEO 3 | – | – |
| VIDEO 4 | 3 MIN – 5 MIN | 0 MIN – 2 MIN |

FIG. 7

```
<smil>
  <body>
    <seq>
      <par>
        <audio begin="0min" src="audio1" dur="3min"/>
        <video begin="2min" src="video1" dur="3min"/>
      </par>
      <par>
        <audio src="audio2" dur="2min"/>
        <video begin="0min" src="video4" dur="2min"/>
      </par>
      <par>
        <audio begin="0min" src="audio3" dur="2min"/>
        <video src="video1" dur="2min"/>
      </par>
    </seq>
  </body>
</smil>
```

FIG. 8

| FILE NAME | FORMATION DATE | USED AREA | CORRESPONDING AREA AFTER DATA DELETION |
|---|---|---|---|
| AUDIO 1 | 2000. 05. 07 | 1 MIN – 4 MIN | 0 MIN – 3 MIN |
| AUDIO 2 | 2000. 06. 15 | 0 MIN – 2 MIN | 0 MIN – 2 MIN |
| AUDIO 3 | 2000. 07. 01 | 1 MIN – 3 MIN | 0 MIN – 2 MIN |
| AUDIO 4 | 2000. 08. 15 | – | – |
| VIDEO 1 | 2000. 06. 29 | 0 MIN – 2 MIN | 0 MIN – 2 MIN |
| | | 4 MIN – 7 MIN | 2 MIN – 5 MIN |
| VIDEO 2 | 2000. 06. 30 | – | – |
| VIDEO 3 | 2000. 07. 01 | – | – |
| VIDEO 4 | 2000. 08. 10 | 3 MIN – 5 MIN | 3 MIN – 5 MIN |

FIG. 10

```
<smil>
  <body>
    <seq>
      <par>
        <audio begin="0min" src="audio1" dur="3min"/>
        <video begin="2min" src="video1" dur="3min"/>
      </par>
      <par>
        <audio src="audio2" dur="2min"/>
        <video begin="3min" src="video4" dur="2min"/>
      </par>
      <par>
        <audio begin="0min" src="audio3" dur="2min"/>
        <video src="video1" dur="2min"/>
      </par>
    </seq>
  </body>
</smil>
```

FIG. 11

| FILE NAME | UNUSED TIME | USED AREA | CORRESPONDING AREA AFTER DATA DELETION |
|---|---|---|---|
| AUDIO 1 | 1 MIN | 1 MIN – 4 MIN | 1 MIN – 4 MIN |
| AUDIO 2 | 4 MIN | 0 MIN – 2 MIN | 0 MIN – 2 MIN |
| AUDIO 3 | 1 MIN | 1 MIN – 3 MIN | 1 MIN – 3 MIN |
| AUDIO 4 | 5 MIN | – | – |
| VIDEO 1 | 3 MIN | 0 MIN – 2 MIN | 0 MIN – 2 MIN |
| | | 4 MIN – 7 MIN | 2 MIN – 5 MIN |
| VIDEO 2 | 5 MIN | – | – |
| VIDEO 3 | 4 MIN | – | – |
| VIDEO 4 | 4 MIN | 3 MIN – 5 MIN | 0 MIN – 2 MIN |

FIG. 13

```
<smil>
  <body>
    <seq>
      <par>
        <audio begin="1min" src="audio1" dur="3min"/>
        <video begin="2min" src="video1" dur="3min"/>
      </par>
      <par>
        <audio src="audio2" dur="2min"/>
        <video begin="1min" src="video4" dur="2min"/>
      </par>
      <par>
        <audio begin="1min" src="audio3" dur="2min"/>
        <video src="video1" dur="2min"/>
      </par>
    </seq>
  </body>
</smil>
```

REPRODUCTION APPARATUS AND REPRODUCTION METHOD

BACKGROUND OF THE INVENTION

1. Field of the Invention

The present invention relates to a reproduction apparatus and a reproduction method.

2. Description of the Related Art

For compression encoding of image data and audio data, there have been considered various technologies. Presently there is particularly known the MPEG-2 (moving picture experts group 2) method. The transport stream method defined in the MPEG-2 system standard (hereinafter represented as MPEG-2 TS) defines a packet of a fixed length, called a transport stream packet, which is suitable for data transfer in a network or the like and is employed in the digital TV broadcasting.

Also recently there is proposed a technology of recording moving image/audio data based on the MPEG-2 TS (hereinafter called MPEG-2 TS data) on a magnetic tape, a hard disk or a magnetooptical disk.

Also in a system of reproducing multimedia data for example of audio or image, there is disclosed SMIL (synchronized multimedia integration language) as the W3C (World Wide Web Consortium) recommendation as the method for defining the reproduction order or the synchronization of plural data. This is based on the XML (extensible markup language), and provides a function of synchronized reproduction of the file by designating an object file utilizing the URI (uniform resource identifiers).

The program information prepared with such SMIL allows to realize various editing and reproducing functions by merely rewriting the content of the program information, without changing the moving image data or audio data recorded on the recording medium.

The moving image or audio data which are not used in the program reproduction can be regarded as unnecessary data. For example, if only a part of the recorded data is used in the program reproduction as a result of editing, other parts become unnecessary. Such unnecessary data, if remaining on the recording medium, will result in a drawback of a lowered efficiency of use of the recording medium.

SUMMARY OF THE INVENTION

In consideration of the foregoing, the object of the present invention is to delete unnecessary data on the recording medium, thereby improving the efficiency of use thereof.

The above-mentioned object can be attained, according to a preferred embodiment of the present invention, by providing a reproducing apparatus comprising:

reproduction means for reproducing moving image data from a recording medium; and control means for changing the recording state of the moving image data in the recording medium based on program information indicating the reproducing procedure of the moving image data by the reproduction means.

Also according to another preferred embodiment of the present invention, there is provided a reproducing apparatus comprising input means for inputting moving image data including plural moving image files, and program data indicating the reproducing procedure of said moving image data;

recording/reproducing means for recording and reproducing the moving image data and the program data input by the input means to or from a recording medium; and control means for controlling the recording/reproducing means so as to change the recording state of the moving image data recorded on the recording medium based on the program data reproduced from the recording medium, and changing the content of said program data based on the image data recorded in said recording medium after the changing of the recording state.

Also according to another preferred embodiment of the present invention there is provided a reproducing method of reproducing moving image data from a recording medium, comprising a step of changing the recording state of said moving image data on the recording medium based on program information indicating the reproducing procedure of the moving image data.

Also according to another preferred embodiment of the present invention, there is provided a method of reproducing moving image data from a recording medium according to program information indicating the reproducing procedure of the moving image data, comprising a step of erasing, from the recording medium, the moving image data irrelevant from the reproducing procedure indicated by said program information among the moving image data recorded on the recording medium.

Also according to another preferred embodiment of the present invention, there is provided a reproducing apparatus comprising a reproduction unit adapted to reproduce one or more moving image data from a recording medium, and a control unit adapted to control the reproducing unit using program indicating a reproducing procedure of the one or more moving image data. The control unit (a) determines one or more parts to be deleted from the one or more moving image data using the program information and a non-reproduction period of each moving image data, (b) controls to delete the one or more parts determined by the control unit from the one or moving image data, and (c) changes the program information according to one or more non-deleted parts of the one or more moving image data after the one or more parts determined by the control unit are deleted from the one or more moving image data.

Also according to another preferred embodiment of the present invention, there is provided a method comprising the steps of controlling the reproduction apparatus using program information indicating a reproducing procedure of the one ore more moving image data so that the one or more moving image data are reproduced from a recording medium, determining one or more parts to be deleted from the one or more moving image data using the program information and a non-reproduction period of each moving image data, deleting the one or more parts determined in the determining step from the one or more moving image data, and changing the program information according to one or more non-deleted part of the one or more moving image data after the one or more parts determined in the determining step are deleted from the one or more moving image data.

Also according to another preferred embodiment of the present invention, there is provided a computer-readable medium storing program codes which, when executed, cause a computer to perform the steps of controlling the computer using program information indicating a reproducing procedure of the one or more moving image data so that the one or more moving image data are reproduced from a recording medium, determining one or more parts to be deleted from the one or more moving image data using the program information and a non-reproduction period of each moving image data, deleting the one or more parts determined in the determining step from the one or more moving image data, and changing the program information according to one or more non-deleted parts of the one or more moving image data after the one or more parts determined in the determining step are deleted from the one or more moving image data.

Still other objects of the present invention, and the advantages thereof, will become fully apparent from the following detailed description of the embodiments.

BRIEF DESCRIPTION OF THE DRAWINGS

FIG. 3 is a view showing program information to be handled in the apparatus shown in FIG. 1;

FIG. 5 is a view showing a table to be employed in the apparatus shown in FIG. 1;

FIG. 7 is a view showing program information to be handled in the apparatus shown in FIG. 1;

FIG. 8 is a view showing another example of the table to be employed in the apparatus shown in FIG. 1;

FIG. 10 is a view showing another program information to be handled in the apparatus shown in FIG. 1;

FIG. 11 is a view showing still another example of the table to be employed in the apparatus shown in FIG. 1;

FIG. 13 is a view showing another program information to be handled in the apparatus shown in FIG. 1.

DETAILED DESCRIPTION OF THE PREFERRED EMBODIMENTS

The preferred embodiments of the present invention will be described in detail hereinafter with reference to the accompanying drawings.

Figure 1:
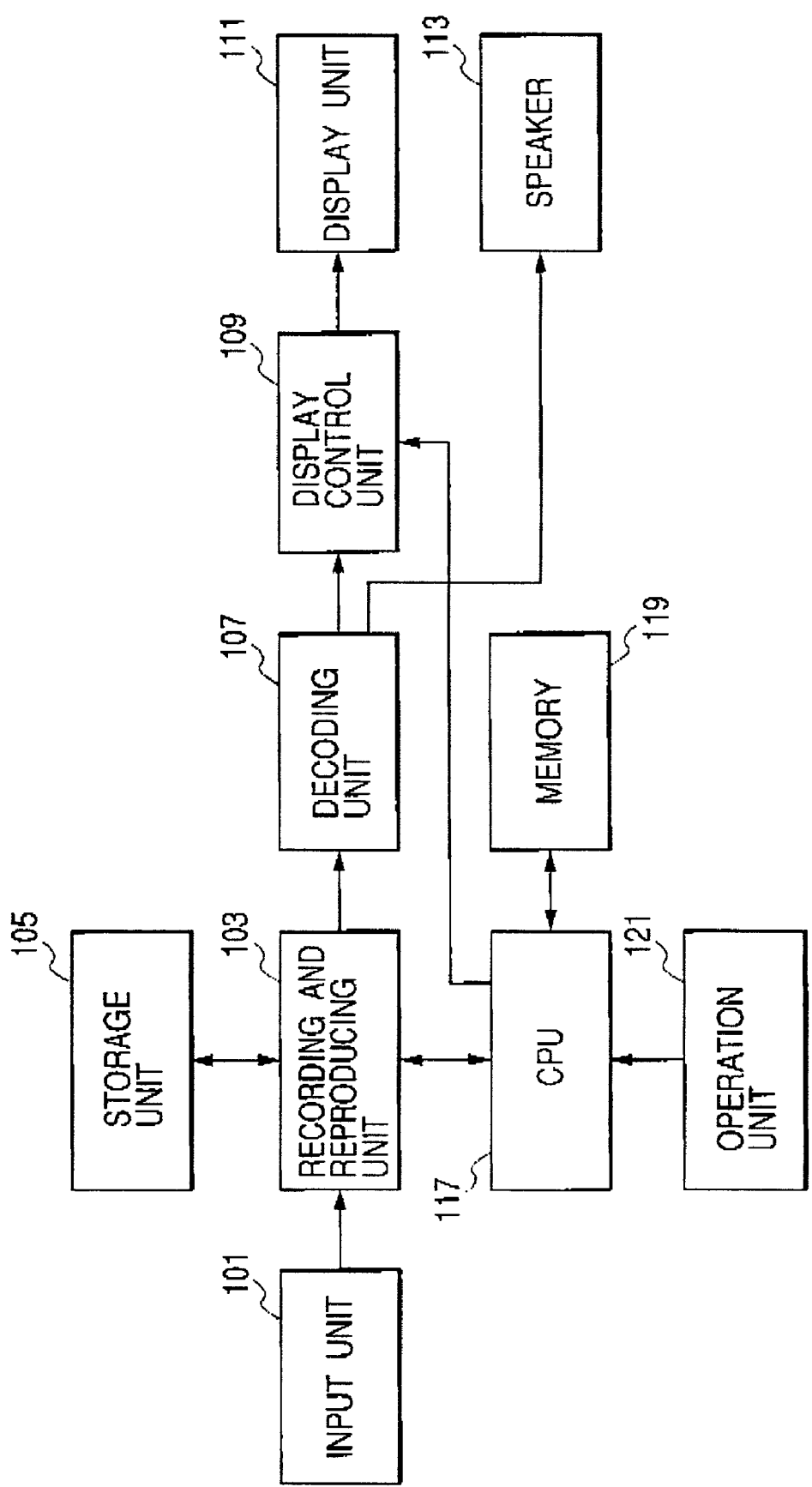
FIG. 1 is a block diagram showing the configuration of a recording/reproducing apparatus in which the present invention is applicable.

FIG. 1 is a block diagram showing the configuration of a recording/reproducing apparatus constituting an embodiment of the present invention. The apparatus shown in FIG. 1 receives and records moving image/audio data based on the MPEG-2 TS method, obtained for example in an external reproducing apparatus, and program information indicating the reproducing procedure of such moving image/audio data.

Referring to FIG. 1, an input unit 101 receives the moving image/audio data of the MPEG-2 TS method and the program information, transmitted from an external apparatus. The recording/reproducing apparatus of the present embodiment records the moving image/audio data of the MPEG-2 TS method in a file format. The moving image/audio data of the MPEG-2 TS method input by the input unit 101 is supplied to a recording/reproducing unit 103, which records the input moving image/audio data of the MPEG-2 TS method in a storage unit 105 such as an HDD.

In the following there will be explained the normal reproducing operation.

In response to an instruction of reproduction from an operation unit 121, a CPU 117 sends a control signal to the recording/reproducing unit 103, which reproduces the data from a designated position in the storage unit 105 to supply the reproduced data to a decoding unit 107. The decoding unit 107 decodes the encoded moving image/audio data in the reproduced data and sends the moving image data to a display control unit 109 and the audio data to a speaker 113.

The display control unit 109 converts the decoded moving image data into a signal of a format matching a display unit 111 to supply the signal thereto, and the display unit 111 displays a moving image according to such reproduced moving image data.

In the following there will be explained the operation of program reproduction utilizing program information.

When a program reproduction mode is set by the operation unit 121, the CPU 117 controls the recording/reproducing unit 103 to read the program information stored in the storage unit 105 and to store the program information in a memory 119. Then the CPU 117 controls the recording/reproducing unit 103 according to thus reproduced program information, thereby executing program reproduction.

In the following there will be explained an auto erasing process for deleting the data stored in the storage unit 105 according to the program information supplied from an external equipment and recorded together with the moving image/audio data.

At first there will be explained the program information employed in the present embodiment.

Figure 2:
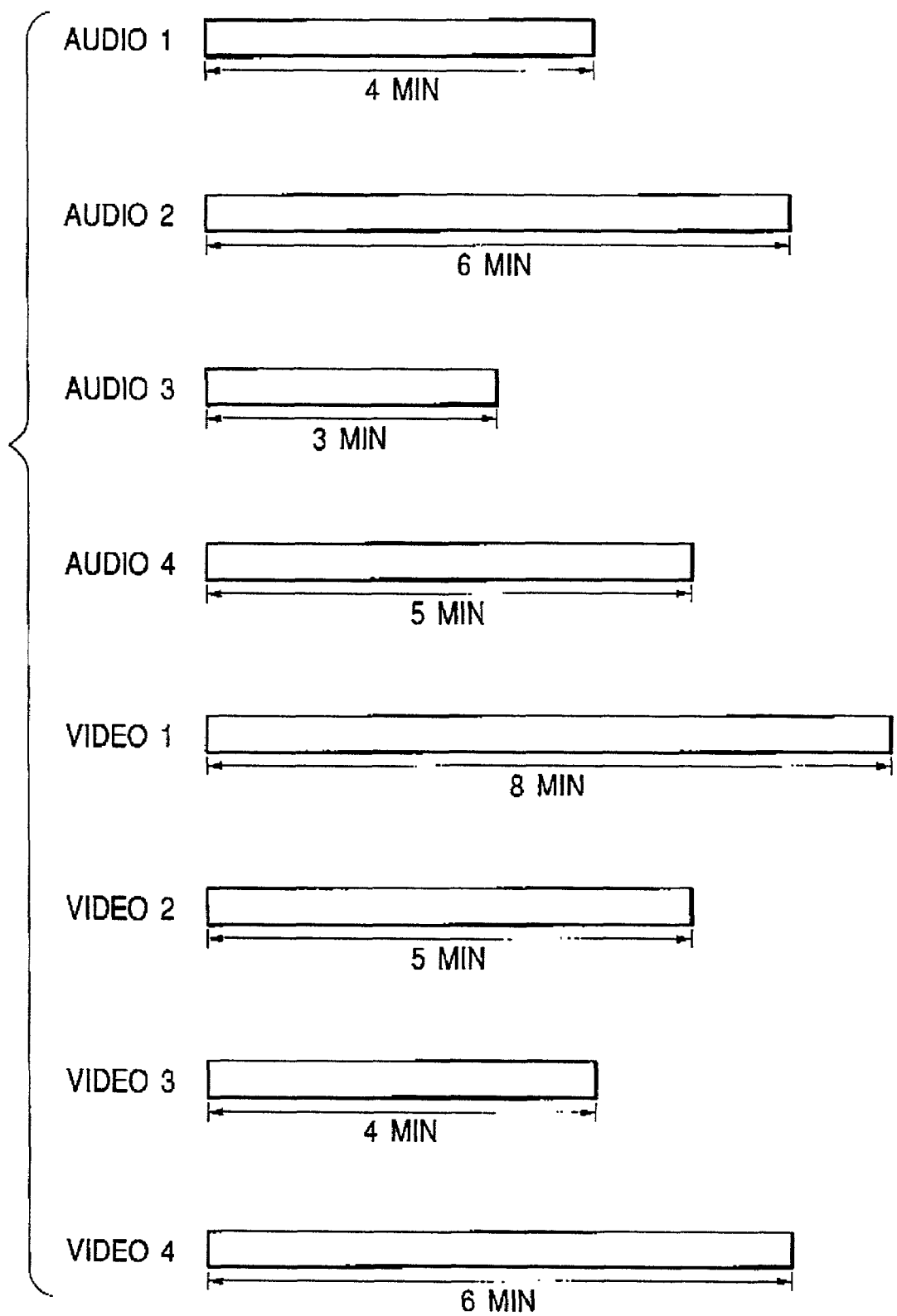
FIG. 2 is a view showing data to be handled in the apparatus shown in FIG. 1.

It is assumed that there have been supplied and recorded audio files (audio 1, audio 2 and audio 3) and moving image files (video 1, video 2 and video 3) of lengths shown in FIG. 2 and program information shown in FIG. 3. FIG. 3 shows an example of the program information, described by SMIL, for reproducing the data of the files shown in FIG. 2.

FIG. 3 indicates that a portion positioned between "<par>" and "</par>" is to be reproduced simultaneously in parallel manner, and a portion positioned between "<seq>" and "</seq>" is to be reproduced sequentially. At first, a portion between the first "<par>" and "</par>" is reproduced simultaneously, then, after the reproduction of such portion, a portion between the second "<par>" and "</par>" is reproduced, and finally a portion between the third "<par>" and "</par>" is reproduced, whereupon the program is terminated.

In the portion between the first "<par>" and "</par>", "audio 1" is selected as the audio data and it is designated to start the reproduction from a position of 1 minute after from the start of the file. There is also selected "video 1" as the moving image data and it is designated to start the reproduction from a position of 4 minutes after from the start of the file. The reproduction is started simultaneously from the respectively designated positions of the audio file and the moving image file, and the synchronized reproduction is terminated after the reproduction of data of a reproducing duration designated by a "dur" paramter (3 minutes in this example).

The synchronized reproduction of the files is similarly executed also in the portion between the second or third "<par>" and "</par>". If a "begin" parameter is not designated at the file designation, the designated file is reproduced from the start thereof.

In case of that such moving image/audio file is stored in the storage unit, the CPU 117 executes the following process in response to an automatic erasing instruction.

At first the CPU 117 controls the recording/reproducing unit 103 to read the program information stored in the storage unit 105 and to write the program information in the memory 119. Then, according to such program information, the CPU discriminates the data used in the program information and those not used, among all the moving image/audio files stored in the storage unit 105.

Figure 4:
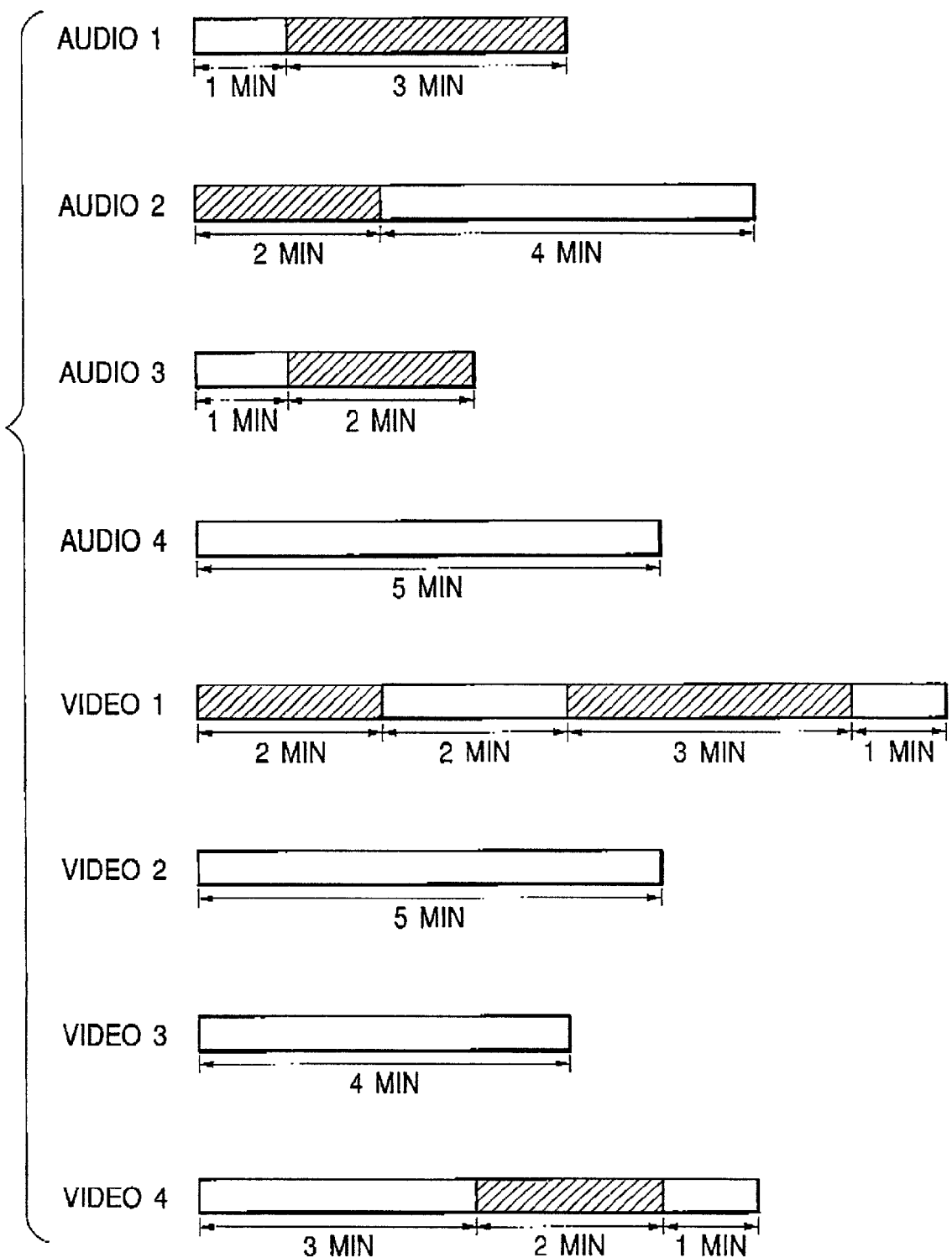
FIG. 4 is a view showing an erasing process in the apparatus shown in FIG. 1.

For example, in case of reproducing the data of the files shown in FIG. 2 according to the program information shown in FIG. 3, the data used in the program reproduction are shown as a hatched area in FIG. 4. Based on the result of discriminating the hatched area, the CPU 117 prepares a table as shown in FIG. 5 and writes the table in the memory 119.

After the discrimination of all the used areas, the CPU 117 operates the areas corresponding to the program information after the deletion of the unnecessary areas, and also writes the result of such operation in the table of the memory 119.

Figure 6:
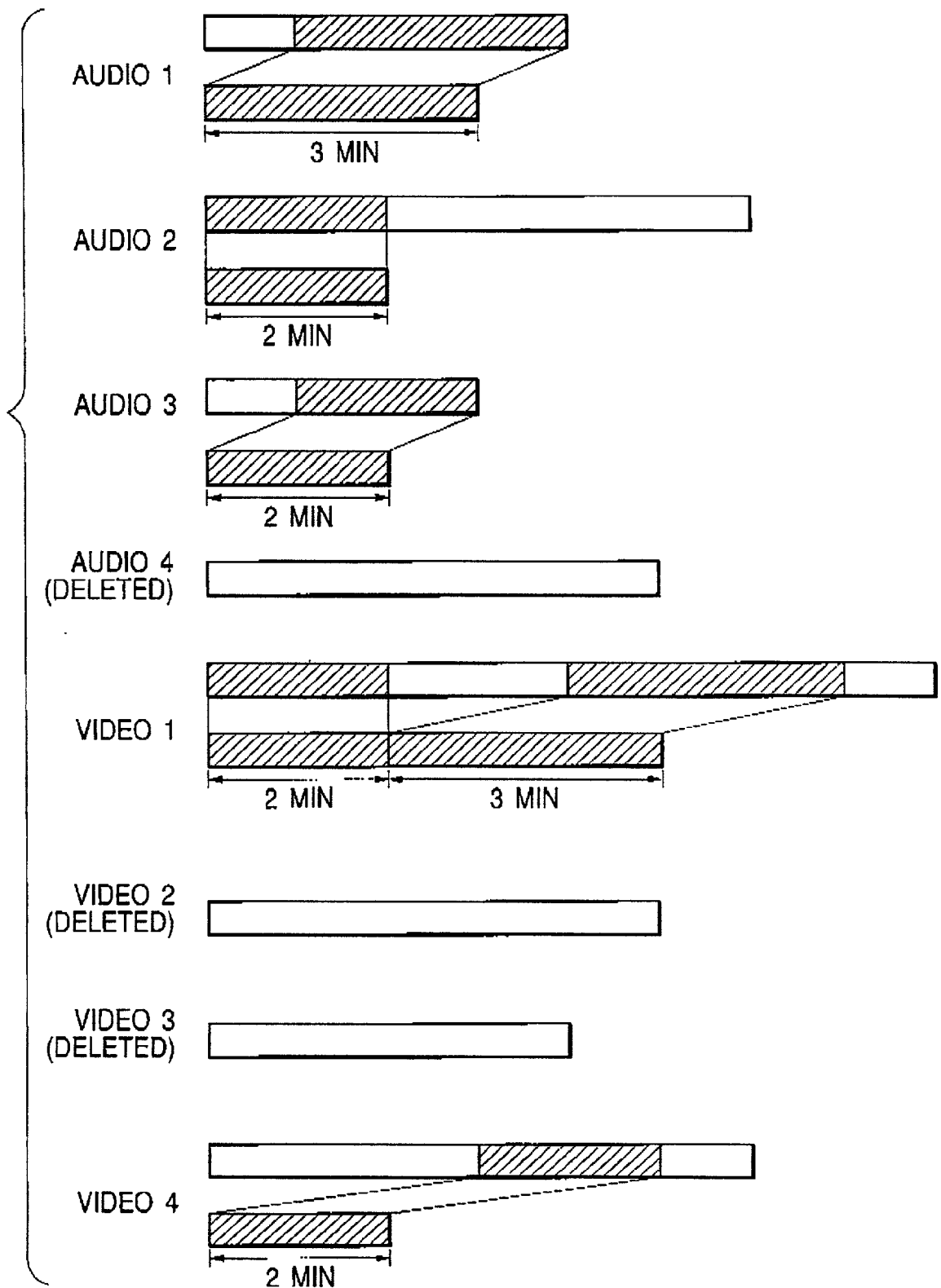
FIG. 6 is a view showing an erasing process in the apparatus shown in FIG. 1.
Figure 9:
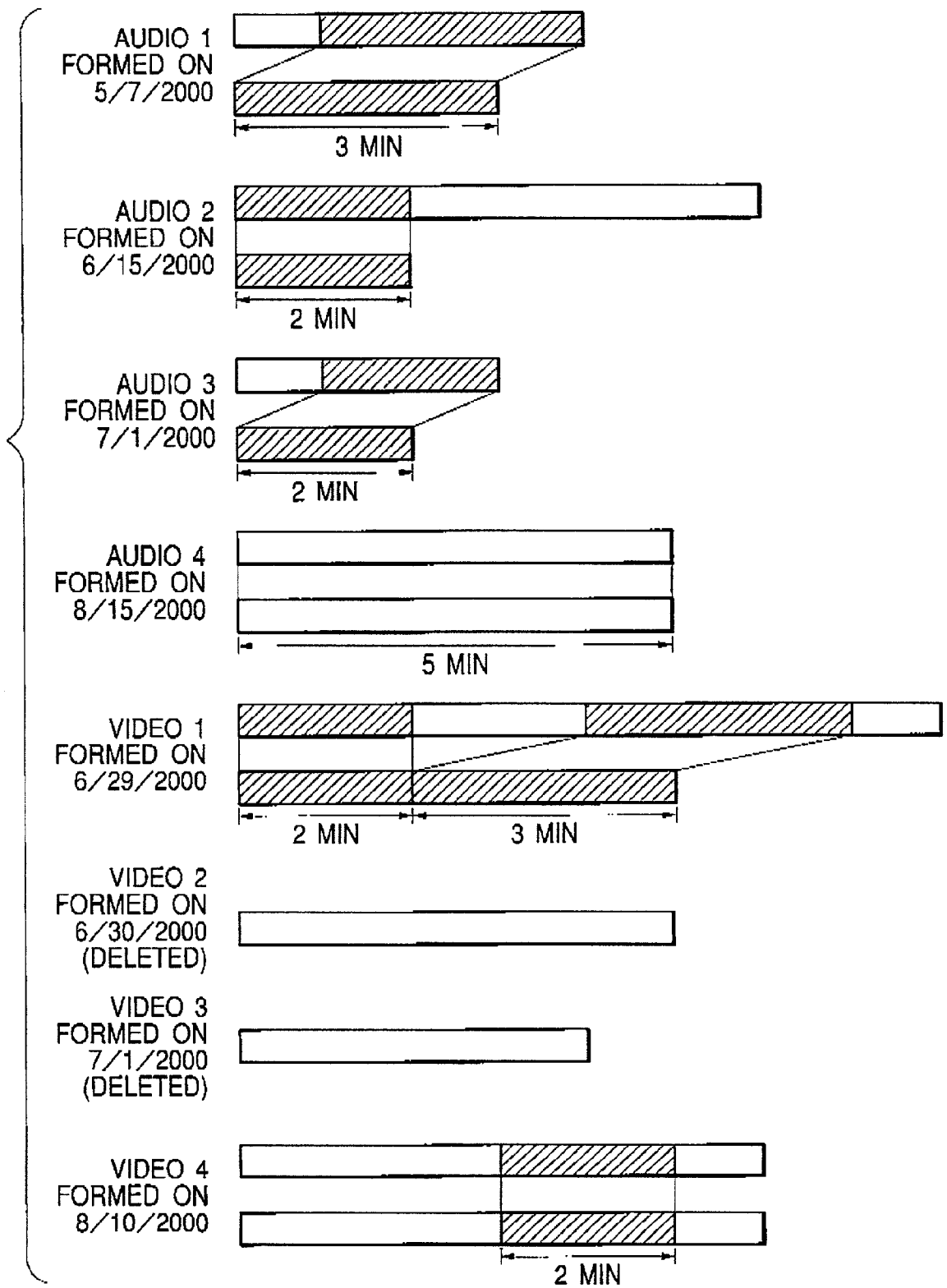
FIG. 9 is a view showing an erasing process in the apparatus shown in FIG. 1.

Now there will be explained, with reference to FIG. 6, the automatic deleting process for an area not designated by the program information.

Based on the program information, the CPU 117 leaves the hatched portion in each file on the storage unit 105 and deletes the other data thereby rendering memory area therefor available for storage. In this operation, in a file containing plural hatched areas, such hatched areas are combined, and a file not containing a hatched area is deleted in whole. More specifically, in the example shown in FIG. 6, in the file "video 1", the two hatched areas are combined, and the files "audio 4", "video 2" and "video 3" are deleted completely. As a result, the hatched areas of the files "audio 1", "audio 2", "audio 3", "video 1" and "video 4" remain recorded in the storage unit 105 while other areas are rendered usable as recordable areas.

More specifically, the directory of the storage unit 105 is so rewritten that the portions other than the hatched areas in FIG. 4 become data unrecorded areas.

In the table shown in FIG. 5, in a column of the "corresponding area after data deletion", there is written information of an area corresponding to the area used by the program information in the files remaining after deletion, and the CPU 117 changes the parameters in the program information shown in FIG. 3 utilizing such corresponding information.

In FIG. 3, it is designated that the reproduction of the file "audio 1" is to be started from a position of 1 minute after from the start position of the file "audio 1". In the table shown in FIG. 5, the corresponding position of the file "audio 1" after deletion, corresponding to the position of 1 minute after from the start of the file "audio 1" before deletion, is operated to be decided as a position 0 minute after, namely the start of the file "audio 1" after deletion.

Therefore, among the program information stored in the memory 119, the CPU 117 changes the "begin" parameter of the "audio 1" to 0 minute or deletes the "begin" parameter since the reproduction is executed from the start of the file. Thereafter the program information is similarly changed by operating the correspondence of the reproducing positions before and after the deletion of the file. In this operation, a file originally lacking the "begin" parameter is to be reproduced from the start and is to be reproduced from the start of the file even after the deletion, so that the program information need not be changed.

As a result, the program information shown in FIG. 3 is changed as shown in FIG. 7. After the change of the program information, the CPU 117 reads the changed program information from the memory 119 to supply it to the recording/reproducing unit 103 and controls the recording/reproducing unit 103 so as to delete the originally recorded program information. The recording/reproducing unit 103 newly records the changed program information on the storage unit 105 and deletes the originally recorded program information.

In the present embodiment, as explained in the foregoing, there is recorded, together with the plural moving image/audio files, the program information indicating the reproducing procedure of such file data, and then there are detected and automatically deleted data not used in the program information of such plural files, whereby it is rendered possible to delete the data unnecessary for the program reproduction from the recording medium and to utilize the recording area of such unnecessary data as a data recordable area.

It is therefore possible to achieve efficient recording on the recording medium.

In the following there will be explained a second embodiment.

In this embodiment, at the automatic deletion of file data, the data to be deleted are deter ed by comparing the date of preparation of each file with the current date.

Also in the present embodiment, the CPU 117 discriminates the hatched area shown in FIG. 4. Then, based on the result of discrimination, a table as shown in FIG. 8 is prepared and stored in the memory 119. After the discrimination of all the used areas, there are operated areas corresponding to the program information after the deletion of the unnecessary areas. Also the result of such operation is stored in the table of the memory 119.

The data to be actually deleted are determined by the date of preparation of each file.

The CPU 117 detects the data of the file preparation date attached to the header of each file recorded in the storage unit 105, and writes the detected preparation date of each file in a column of the "preparation date" in the table shown in FIG. 8. Then the CPU 117 determines the data to be deleted, based on the current date and the preparation date of each file.

For example, in case of executing data deletion of a file prepared more than one month ago from the current date which is 31st August, the CPU 117 compares the date of an incorporated calender clock with the preparation date of each file, and automatically deletes the unnecessary data, as in the foregoing embodiment, of the files having preparation dates longer than one month from the current date, namely the six files "audio 1", "audio 2", "audio 3", "video 1", "video 2" and "video 3". Other files "audio 4" and "video 4" are not subjected to automatic deletion of the unnecessary data but are left unchanged in the storage unit 105.

As a result, in the storage unit 105, there remain files "audio 1", "audio 2", "audio 3" and "video 1" from which the unnecessary data have been deleted and the files "audio 4" and "video 4" not subjected to data deletion.

In a table shown in FIG. 8, in a column indicating the "corresponding area after data deletion", there is written area information corresponding to the area used by the program information in the files after deletion, and the CPU 117 changes the parameters in the program information shown in FIG. 3 utilizing such corresponding information. In this example, however, the parameters in the program information are changed only for the four files "audio 1", "audio 2", "audio 3" and "video 4" but not for the files "audio 4" and "video 4".

As a result, the CPU 117 finally prepares the program information shown in FIG. 11 and stores it in the memory 119. The CPU then reads the program information stored in the memory 119 to supply it to the recording/reproducing unit 103 and outputs a control signal for deleting the originally recorded program information. The recording/ reproducing unit 103 records the changed program information on the storage unit 105 and deletes the originally recorded program information.

In this manner the present embodiment automatically deletes the data not used in the program reproduction among the recorded data, thereby achieving efficient utilization of the recording medium.

Also in the present embodiment, by comparing the preparation date of each file with the current date to delete the data, it is rendered possible to delete unnecessary data in relatively old files and to retain relatively recent files unchanged.

In the foregoing there has been explained a case of automatically deleting the unnecessary data only in files prepared more than one month prior to the current date, but such example is not restrictive and the period from the current date can be selected arbitrarily by the user.

In the following there will be explained a third embodiment of the present invention.

In the present embodiment, the deletion of the unnecessary data is executed according to the duration (amount) not used in the program reproduction in each file.

Also in the present embodiment, the CPU 117 discriminates the hatched area shown in FIG. 4, and, based on such discrimination, prepares and stores a table shown in FIG. 11 in the memory 119. After the discrimination of all the used areas, there are operated areas corresponding to the program information after the deletion of the unnecessary areas. Also the result of such operation is stored in the table of the memory 119.

Then the data to be actually deleted are determined according to the duration of data not used in the program reproduction, of each file.

The CPU 117 confirms the program information stored in the memory 119, detects the data duration not used for program reproduction in each file and stores such duration in a column for the "unused time" in a table shown in FIG. 11. The CPU 117 determines the data to be deleted by comparing such unused time with a predetermined threshold value.

Figure 12:
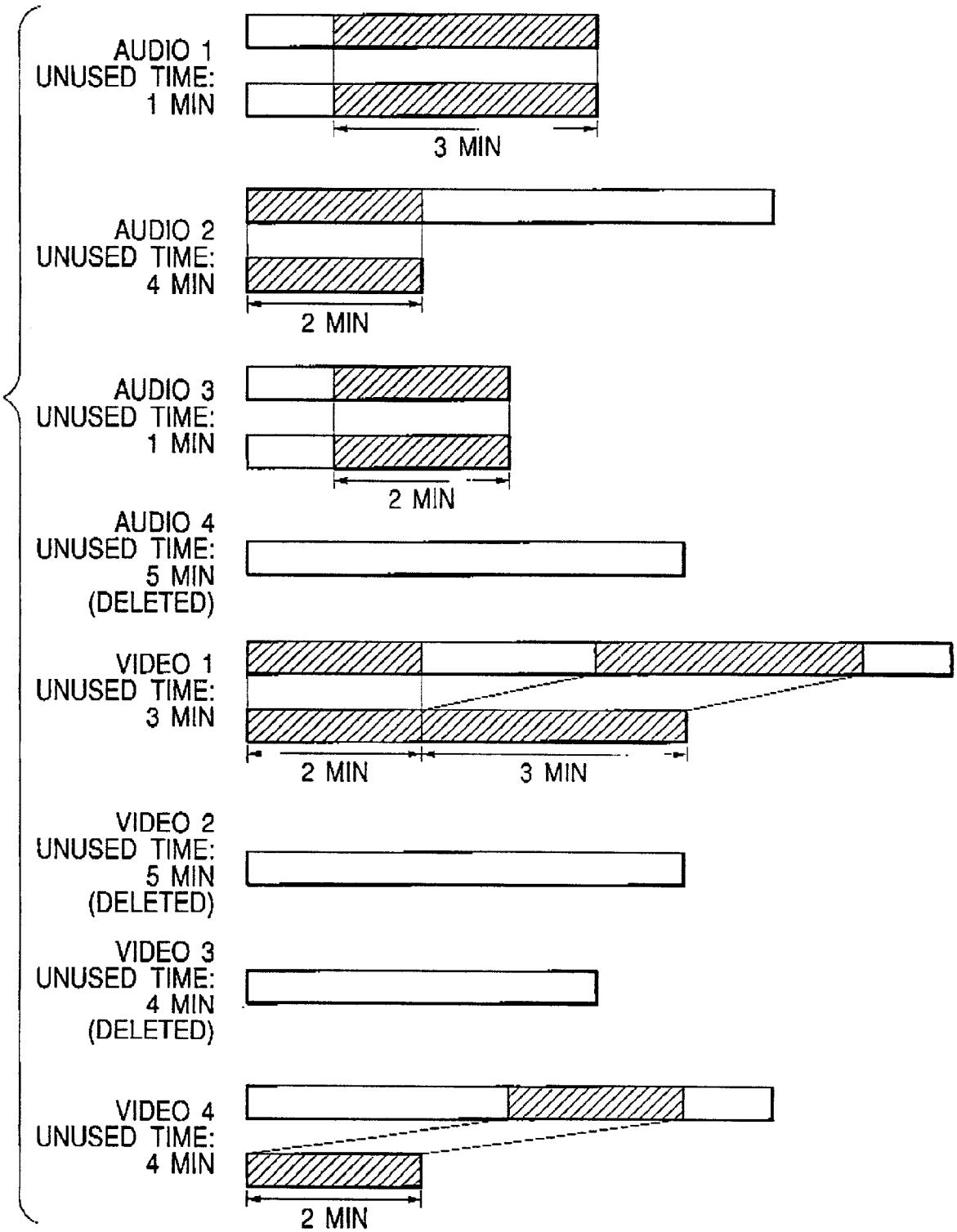
FIG. 12 is a view showing an erasing process in the apparatus shown in FIG. 1.

As an example, consider a case of executing deletion of the unnecessary data of the files for which the unused time is three minutes or longer. As shown in FIG. 12, an unused time equal to or longer than 3 minutes is found in six files "audio 2", "audio 4", "video 1", "video 2", "video 3" and "video 4". The CPU 117 executes automatic deletion of the unnecessary data as in the first embodiment on these fix files, but other files "audio 1" and "audio 3" are left unchanged in the storage unit 105 without the automatic deletion of the unnecessary data.

As a result, in the storage unit 105, there remain files "audio 2", "video 1" and "video 4" from which the unnecessary data have been deleted and the files "audio 1" and "audio 3" not subjected to data deletion.

In a table shown in FIG. 11, in a column indicating the "corresponding area after data deletion", there is written area information corresponding to the area used by the program information of the files after deletion, and the CPU 117 changes the parameters in the program information shown in FIG. 3 utilizing such corresponding information. In this example, however, the parameters in the program information are changed only for the three files "audio 2", "video 1" and "video 4" but not for the files "audio 1" and "audio 3".

As a result, the CPU 117 finally prepares the program information shown in FIG. 13 and stores it in the memory 119. The CPU then reads the program information stored in the memory 119 to supply it to the recording/reproducing unit 103 and outputs a control signal for deleting the originally recorded program information. The recording/ reproducing unit 103 records the changed program information on the storage unit 105 and deletes the originally recorded program information.

In this manner the present embodiment automatically deletes the data not used in the program reproduction among the recorded data, thereby achieving efficient utilization of the recording medium.

Also the present embodiment executes deletion of unnecessary data only in files having a relatively long period not used in the program reproduction, thereby retaining files having a relatively short period not used in the program reproduction.

In the foregoing there has been explained a case of automatically deleting the unnecessary data of files for which the period not used in the program reproduction is at least equal to three minutes, but such example is not restrictive and the period can be selected arbitrarily by the user.

Also in the foregoing embodiments, the program information is input together with the moving image/audio data from the exterior and recorded in the storage unit, but it is also possible to prepare the program information as shown in FIG. 3 by the user under monitoring of the image and audio data recorded in the storage unit.

The present invention is applicable to a system consisting of plural equipment (for example, host computer, interface devices, reader, printer etc.) or to an apparatus consisting of a single equipment.

The present invention also includes a case of supplying a computer of a system or an apparatus, connected to various devices so as to realize the functions of the aforementioned embodiments, with program codes of a software for realizing the functions of the aforementioned embodiments and causing the computer (or CPU or MPU) of such system or apparatus to operate the devices according to the stored program.

Thus, the aforementioned recording/reproducing process may also be realized by a software process utilizing a microcomputer.

In such case, the program codes themselves of the aforementioned software realize the functions of the aforementioned embodiments, and the program codes themselves and the means for supplying the computer with the program codes such as a memory medium storing such program codes also constitute the present invention. The memory medium for storing such program codes can be, for example, a floppy disk, a hard disk, an optical disk, a magnetooptical disk, a CD-ROM, a magnetic tape, a non-volatile memory card, a ROM or the like.

The present invention naturally includes not only a case where the functions of the aforementioned embodiments are realized by the execution of the supplied program codes by the computer but also a case where the functions of the aforementioned embodiments are realized by the cooperation of the program codes with an operating system functioning on the computer or another application software.

The present invention further includes a case where the supplied program codes are once stored in a memory provided in a function expansion board inserted into the computer or a function expansion unit connected thereto and a CPU or the like provided in such function expansion board or function expansion unit executes all the processes or a part thereof under the instruction of the program codes, thereby realizing the functions of the aforementioned embodiments.

The invention may be embodied in other specific forms without departing from essential characteristics thereof.

Therefore, the above-described embodiments are merely exemplary of this invention, and are not be construed to limit the scope of the present invention.

The scope of the present invention is defined by the scope of the appended claims, and is not limited to only the specific description in this specification. Furthermore, all the modifications and changes belonging to equivalents of the claims are considered to fall within the scope of the present invention.

What is claimed is:

1. A reproducing apparatus comprising:
   a reproduction unit adapted to reproduce one or more moving image data from a recording medium; and
   a control unit adapted to control said reproduction unit using program information indicating a reproducing procedure of the one or more moving image data,
   wherein said control unit (a) determines one or more parts to be deleted from the one or more moving image data using the program information and a non-reproduction period of each moving image data, (b) controls to delete the one or more parts determined by said control unit from the one or more moving image data, and (c) changes the program information according to one or more non-deleted parts of the one or more moving image data after the one or more parts determined by said control unit are deleted from the one or more moving image data.

2. An apparatus according to claim 1, wherein the one or more parts of the one or more moving image data deleted by said control unit are irrelevant to the program information.

3. An apparatus according to claim 1, further comprising a recording unit adapted to record the program information changed by said control unit on the recording medium.

4. An apparatus according to claim 1, wherein said control unit determines the one or more parts to be deleted from the one or more moving image data using the program information a preparation date of each moving image data.

5. An apparatus according to claim 1, wherein said reproduction unit reproduces the program information from the recording medium.

6. An apparatus according to claim 1, wherein the one or more moving image data conform to MPEG-2 TS format.

7. An apparatus according to claim 1, wherein the program information conforms to SMIL (Synchronized Multimedia Integration Language).

8. A method comprising the steps of:
   controlling the reproduction apparatus using program information indicating a reproducing procedure of the one or more moving image data so that the one or more moving image data are reproduced from a recording medium;
   determining one or more parts to be deleted from the one or more moving image data using the program information and a non-reproduction period of each moving image data;
   deleting the one or more parts determined in said determining step from the one or more moving image data; and
   changing the program information according to one or more non-deleted part of the one or more moving image data after the one or more parts determined in said determining step are deleted from the one or more moving image data.

9. A method according to claim 8, wherein the one or more parts of the one or more moving image data deleted in said deleting step are irrelevant to the program information.

10. A method according to claim 8, further comprising the step of recording the program information changed in said changing step on the recording medium.

11. A method according to claim 8, further comprising the step of determining the one or more parts to be deleted from the one or more moving image data using the program information and a preparation date of each moving image data.

12. A method according to claim 8, further comprising the step of reproducing the program information from the recording medium.

13. A method according to claim 8, wherein the one or more moving image data conform to MPEG-2 TS format.

14. A method according to claim 8, wherein the program information conforms to SMIL (Synchronized Multimedia Integration Language).

15. A computer-readable medium storing program codes which, when executed, cause a computer to perform the steps of:
   controlling the computer using program information indicating a reproducing procedure of the one or more moving image data so that the one or more moving image data are reproduced from a recording medium;
   determining one or more parts to be deleted from the one or more moving image data using the program information and a non-reproduction period of each moving image data;
   deleting the one or more parts determined in the determining step from the one or more moving image data; and
   changing the program information according to one or more non-deleted parts of the one or more moving image data after the one or more parts determined in the determining step are deleted from the one or more moving image data.

16. A computer-readable medium according to claim 15, wherein the one or more parts of the one or more moving image data deleted in said deleting step are irrelevant to the program information.

17. A computer-readable medium according to claim 15, wherein the program codes further cause the computer to perform the step of recording the program information changed in said changing step on the recording medium.

18. A computer-readable medium according to claim 15, wherein the program codes further cause the computer to perform the step of determining the one or more parts to be deleted from the one or more moving image data using the program information and a preparation date of each moving image data.

19. A computer-readable medium according to claim 15, wherein the program codes further cause the computer to perform the step of reproducing the program information from the recording medium.

20. A computer-readable medium according to claim 15, wherein the one or more moving image data conform to MPEG-2 TS format.

21. A computer-readable medium according to claim 15, wherein the program information conforms to SMIL (Synchronized Multimedia Integration Language).

* * * * *

UNITED STATES PATENT AND TRADEMARK OFFICE
CERTIFICATE OF CORRECTION

PATENT NO.      : 7,149,409 B2
APPLICATION NO. : 09/955135
DATED           : December 12, 2006
INVENTOR(S)     : Shinji Ohnishi It is certified that error appears in the above-identified patent and that said Letters Patent is hereby corrected as shown below:

ON COVER PAGE AT (57) ABSTRACT

Line 7, "of more" should read --or more--.

COLUMN 1

Line 19, "Also" should read --Also,--.

COLUMN 2

Line 9, "invention" should read --invention,--;
　　Line 35, "one or" should read --one or more--; and
　　Line 52, "part" should read --parts--.

COLUMN 3

Line 62, "following" should read --following,--.

COLUMN 4

Line 11, "following" should read --following,--; and
　　Line 20, "following" should read --following,--.

COLUMN 6

Line 16, "following" should read --following,--;
　　Line 19, "deter ed" should read --determined--; and
　　Line 27, "Also" should read --Also,--.

COLUMN 7

Line 19, "following" should read --following,--; and
　　Line 29, "Also" should read --Also,--.

COLUMN 8

Line 10, "Also" should read --Also,--.

UNITED STATES PATENT AND TRADEMARK OFFICE
CERTIFICATE OF CORRECTION

PATENT NO.       : 7,149,409 B2
APPLICATION NO.  : 09/955135
DATED            : December 12, 2006
INVENTOR(S)      : Shinji Ohnishi It is certified that error appears in the above-identified patent and that said Letters Patent is hereby corrected as shown below:

COLUMN 9

Line 62, "part" should read --parts--.

Signed and Sealed this

Ninth Day of September, 2008

JON W. DUDAS
*Director of the United States Patent and Trademark Office*